(No Model.)
D. GREEN.
VEHICLE BRAKE.
No. 282,717. Patented Aug. 7, 1883.
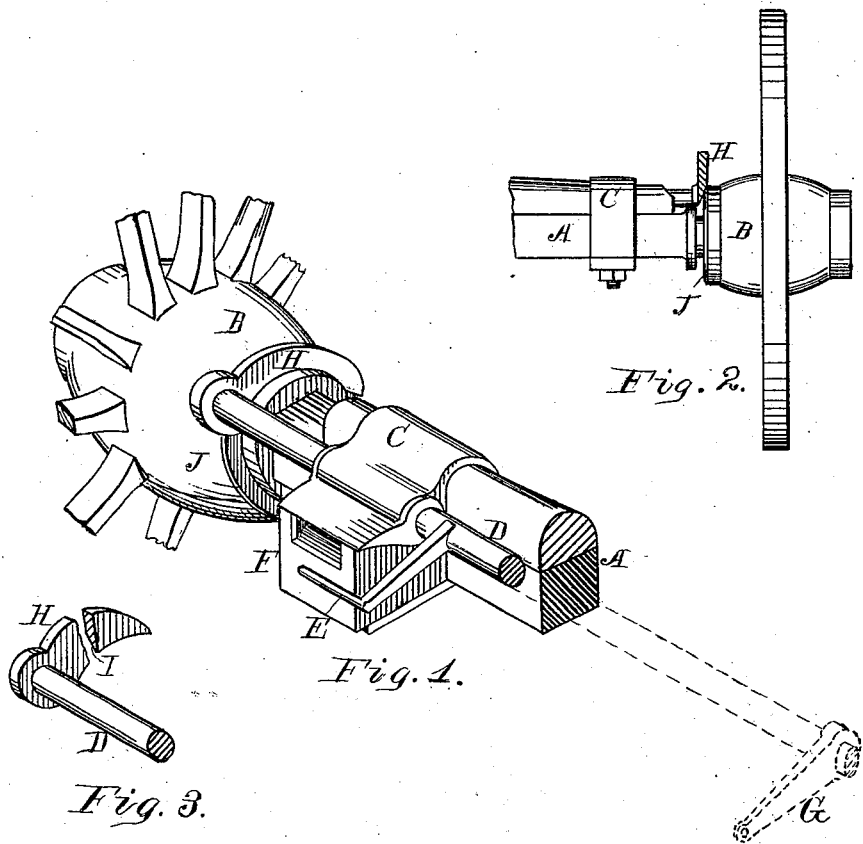

UNITED STATES PATENT OFFICE.

DUBY GREEN, OF CINCINNATI, OHIO.

VEHICLE-BRAKE.

SPECIFICATION forming part of Letters Patent No. 282,717, dated August 7, 1883.

Application filed February 8, 1883. (No model.)

*To all whom it may concern:*

Be it known that I, DUBY GREEN, of Cincinnati, in the county of Hamilton and State of Ohio, have invented a new and useful Improvement in Vehicle-Brakes, which improvement is fully set forth in the following specification and accompanying drawings, in which—

Figure 1 is a perspective view of one end of the fore axle of a vehicle having a hub thereon equipped with my improved safety-brake. Fig. 2 is a view of the rear side of the same, and Fig. 3 is a perspective view of the cross rod or shaft carrying the brake piece or cam.

The object of the present invention is to provide a vehicle with a simple, easily-adjustable, and cheap brake for the forward wheels, constructed in such a manner that the brake can be operated by the occupant of the vehicle in case of accidents, the whole being so arranged that the device does not produce an unsightly appearance on the vehicle, and to enable it to be easily placed on any vehicle whether originally adapted for this brake or not.

In a former patent issued to me for a detachable thill-coupling I fully set forth the arrangements of a cross rod or shaft communicating with both thill-couplings on the fore axle. The thill-coupling in that patent was designed as a detacher, so that in case of runaway accidents the driver could quickly detach the shafts from the vehicle and free the animal. It is obvious that to simply detach the animal without checking the momentum of the vehicle does not in all cases offer absolute security to the occupants, and I therefore design in this invention to equip the forward axle with a braking device capable of being manipulated by the same train of rods and levers that detach the shafts, so that when the shafts are disengaged the brake acts simultaneously without requiring any other action on the part of the driver than the simple one of detaching the animal, all of which will now be set forth in detail.

In the accompanying drawings, A represents the axle, B the hub, and C the clip, carrying the detachable thill-coupler for which Letters Patent were issued to me, as stated. D is the cross shaft or rod, as stated in the said patent, journaled in the clip C and carrying the angle arm or bar E, which projects forward and slightly below the housing F, into which the thill-iron hook is placed. Centrally or midway between the clip C the rod is provided with a forwardly-projecting arm or lever, G, to which is attached the strap, rope, chain, rod, or other operating device running from the driver's position in the vehicle. In the present invention the ends of the rod D are produced so that they extend beyond the clip C as far as the inner end of the hub B, where the said rod is equipped with a rearwardly-projecting blade or piece, H, preferably slightly curved and swaged on its outer lower side, as shown at I, or made flaring. This piece H is so located on the rod D that when the hub is in its normal position the flaring or swaged outer side of the piece H will strike the inner end of the hub and around the hub out against the linchpin, thus frictionally impeding the rotation of the hub. I prefer having a run or plate, J, placed on the hub B to serve as a surface for the plate H to bind against. By this arrangement the surface of the hub is not injured in the action of the brake-piece. The friction-plate is of course only placed on wooden hubs, as the metal hubs are sufficiently protected.

The operation is readily understood. When the occupant or the driver in the vehicle draws up the strap or rope attached to the arm, G rotates the rod D and the angle-arm E releases the shafts from the housing F. At the same time the swaged brake-plate H comes in contact with the end of the hub, binds against the same as the driver exerts his force, and checks the vehicle.

It is obvious that this brake may be attached to any vehicle independently of the improved coupling.

I do not claim as broadly new a frictional brake applied to the hub of a wheel.

What I claim is—

The cross-rod D on the forward axle, having centrally the operating-arm, G, and at each end a clip or coupling, the angle-arms E, for detaching the thill-iron, and provided on the ends with the flaring plates H, in combination with the hubs, whereby the rotation of the hubs can be impeded, substantially as herein set forth.

In testimony that I claim the foregoing I have hereunto set my hand, this 2d day of February, 1883, in the presence of witnesses.

DUBY GREEN.

Witnesses:
E. H. BAKER,
PHILIP S. GOODWIN.